United States Patent [19]

Fajt et al.

[11] 4,424,894
[45] Jan. 10, 1984

[54] SEQUENCING LAMP FEEDER

[75] Inventors: John Fajt; James V. Neal, Jr., both of Wynnewood, Okla.

[73] Assignee: Xenell Corporation, Wynnewood, Okla.

[21] Appl. No.: 186,588

[22] Filed: Sep. 12, 1980

[51] Int. Cl.³ .............................................. B65G 47/68
[52] U.S. Cl. ....................................... 198/451; 221/307
[58] Field of Search ....................... 198/451, 530, 492; 221/310, 307, 308, 296, 289, 68

[56] References Cited

U.S. PATENT DOCUMENTS

| | | |
|---|---|---|
| 1,092,602 | 4/1914 | Smith et al. |
| 1,698,955 | 1/1929 | Lutfring ............................... 221/289 |
| 1,791,044 | 2/1931 | Steele . |
| 2,428,103 | 9/1947 | Vergobbi ......................... 198/492 X |
| 2,479,878 | 8/1949 | Strelzoff .................................. 221/68 |
| 2,829,758 | 4/1955 | Temple ................................ 198/451 |
| 2,860,762 | 11/1958 | Alexander ........................... 198/451 |
| 2,915,217 | 12/1959 | Chaplinski ........................... 221/296 |
| 3,064,792 | 11/1962 | Du Broff . |
| 3,144,119 | 8/1964 | Nigrelli et al. . |
| 3,288,331 | 11/1966 | Myzurkivich ......................... 221/68 |
| 3,332,530 | 7/1967 | Greulich . |
| 3,536,179 | 10/1970 | Pearson . |
| 3,841,461 | 10/1974 | Henderson et al. . |
| 3,850,281 | 11/1974 | Focke et al. . |
| 3,977,160 | 8/1976 | Klug ....................................... 221/68 |
| 4,351,578 | 9/1982 | Fajt et al. ........................ 198/451 X |

FOREIGN PATENT DOCUMENTS

| | | |
|---|---|---|
| 1474706 | 7/1969 | Fed. Rep. of Germany . |
| 722643 | 1/1955 | United Kingdom ................. 221/68 |
| 853084 | 11/1960 | United Kingdom . |
| 375236 | 6/1973 | U.S.S.R. .............................. 198/451 |

Primary Examiner—John J. Love
Assistant Examiner—Paul A. Sobel
Attorney, Agent, or Firm—Laney, Dougherty, Hessin & Beavers

[57] ABSTRACT

A sequencing drop chute apparatus receives a batch of electrical components and feeds them one at a time to a single line conveyor. The sequencing drop chute apparatus includes a support frame with an inclined surface attached to the support frame. A plurality of walls extend upward from an upper portion of the inclined surface and divide the upper portion of the inclined surface into a plurality of chutes. There is at least one chute for each electrical component of a batch of electrical components. A camshaft is rotatingly mounted upon the frame and includes a plurality of eccentric cams one of which is operably associated with each of the chutes for periodically blocking and periodically opening each of the chutes. The cams are arranged so that the plurality of chutes are opened one at a time thereby permitting the batch of electrical components to pass one at a time through the drop chute apparatus to the conveyor.

15 Claims, 6 Drawing Figures

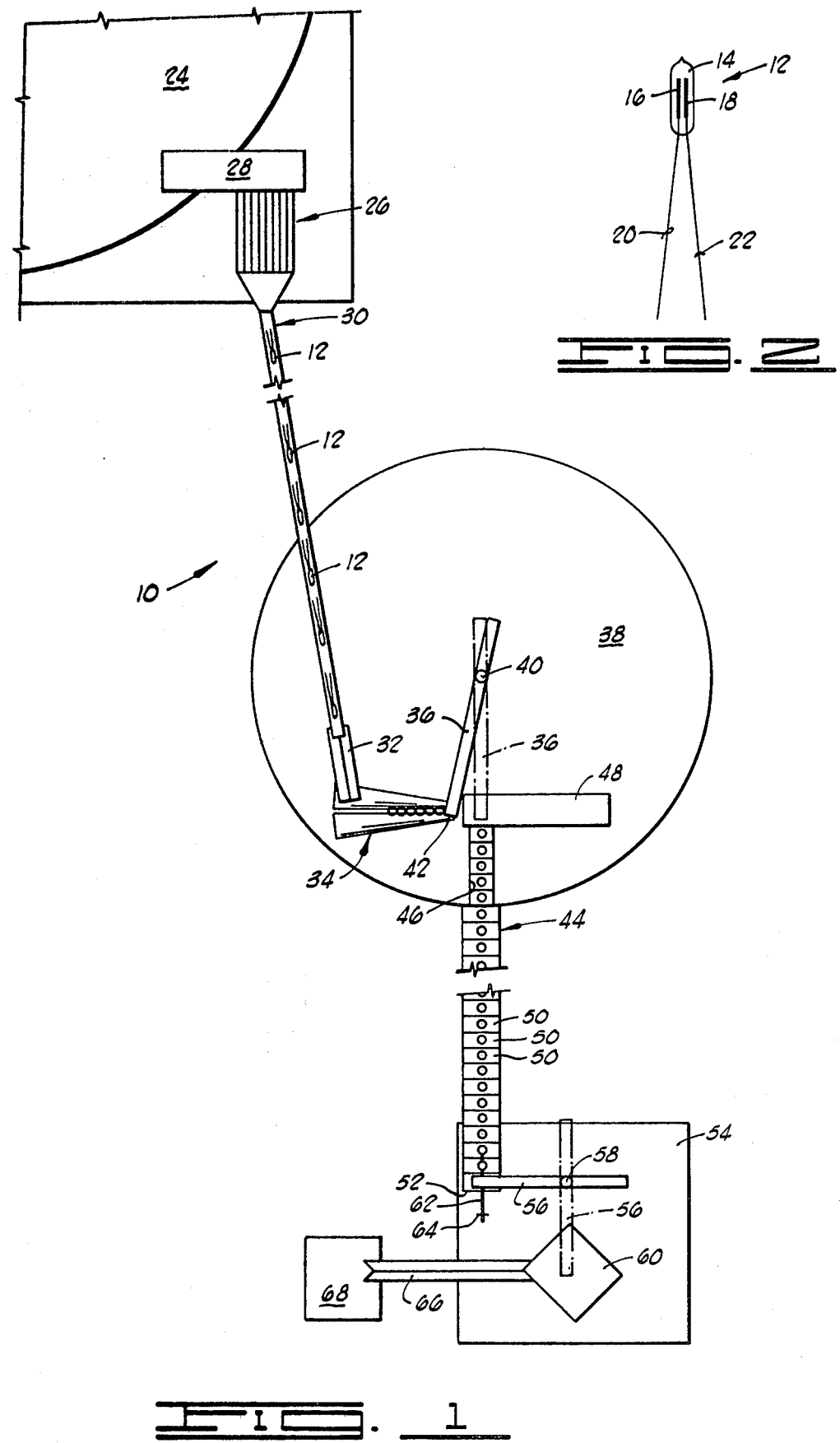

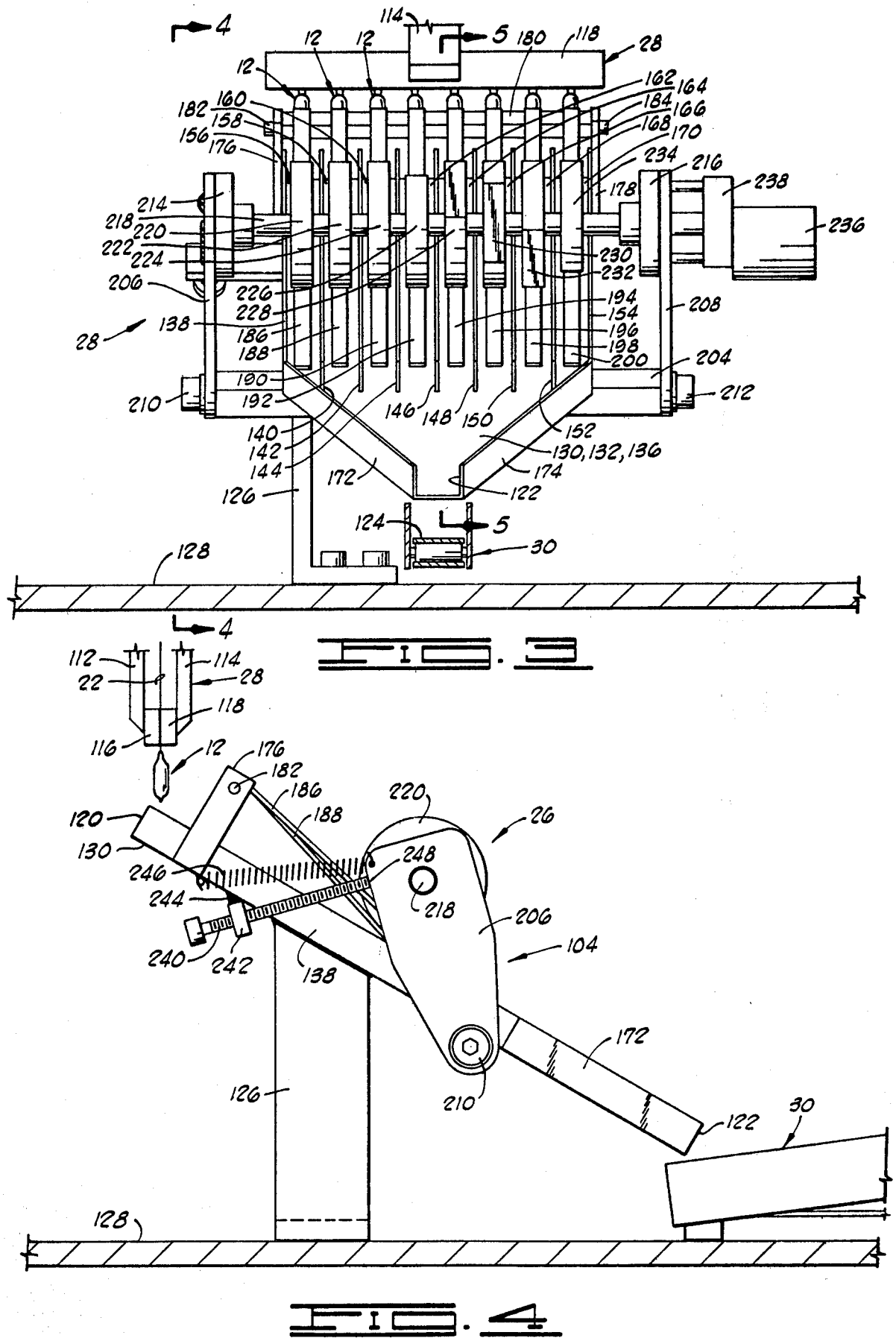

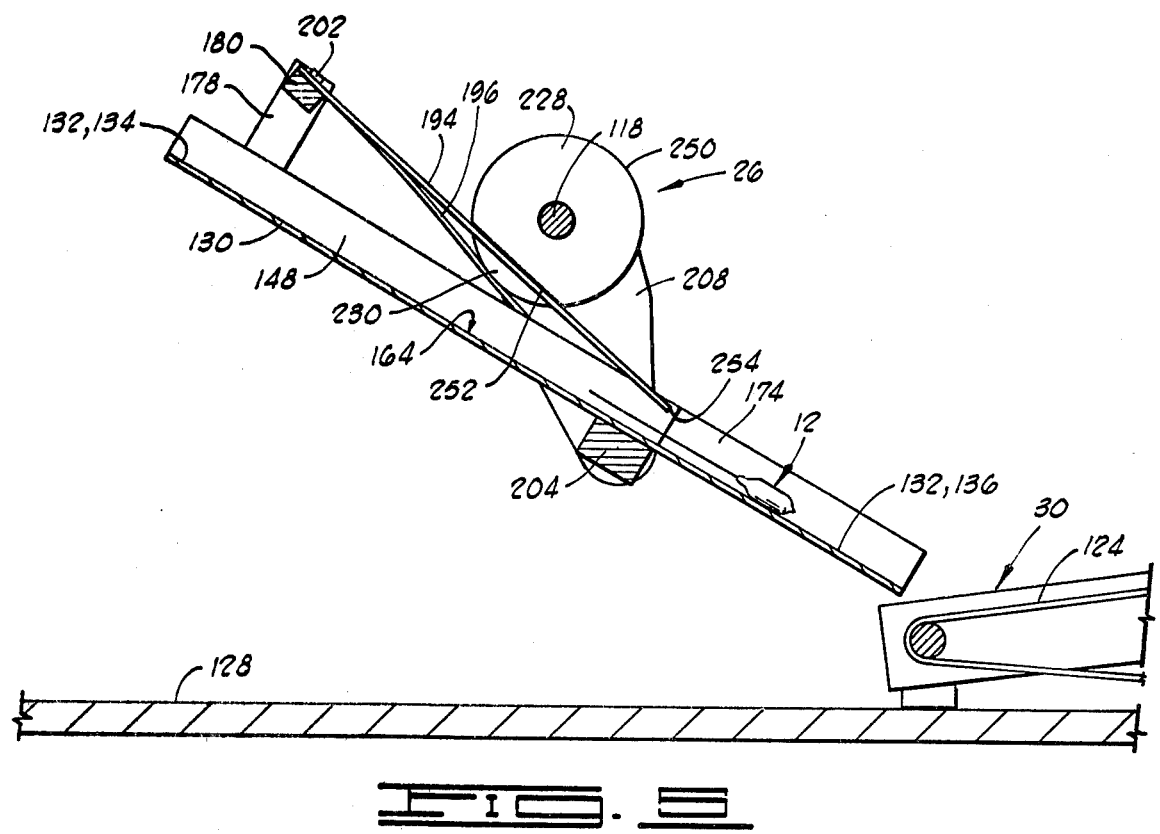
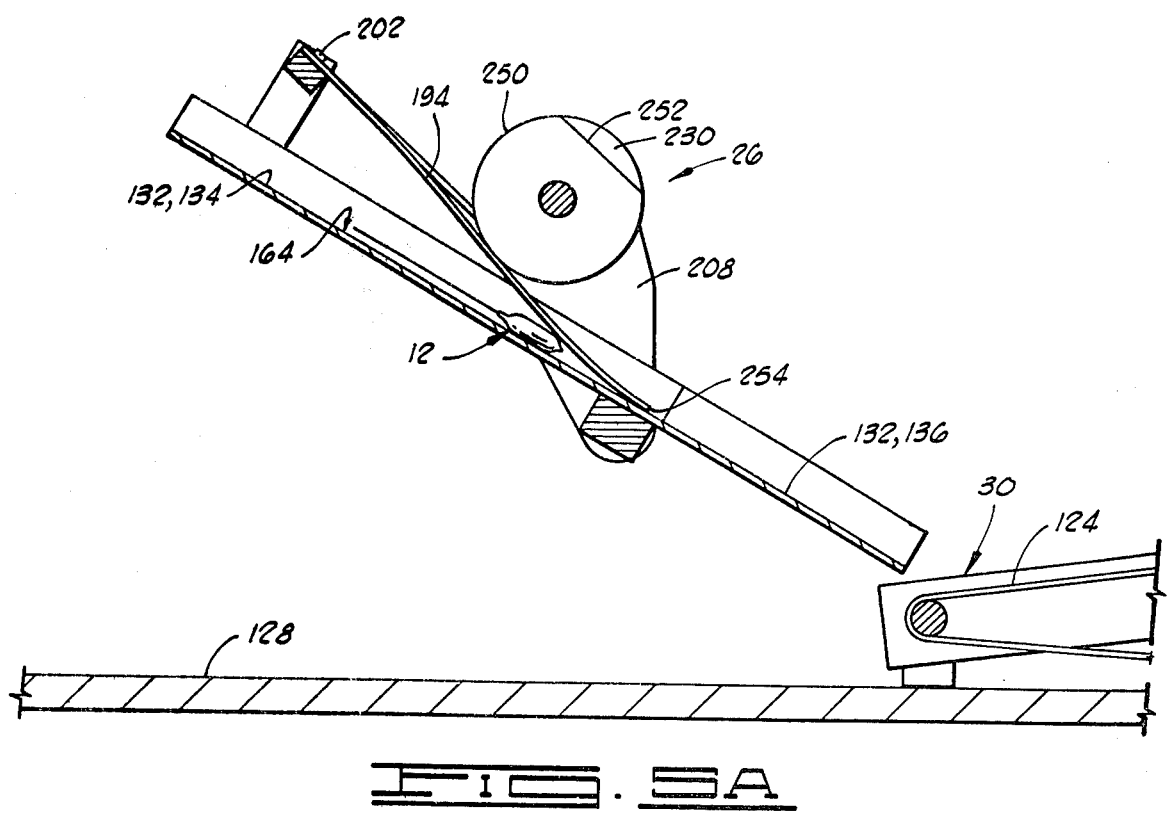

SEQUENCING LAMP FEEDER

BACKGROUND OF THE INVENTION

1. Field of the Invention

The present invention relates generally to apparatus for handling electrical components, and more particularly, but not by way of limitation, to such apparatus designed for use with negative glow lamps.

2. Description of the Prior Art

A negative glow lamp is an electrical component having a cylindrical glass bulb approximately $\frac{1}{2}$ inch in length and $\frac{1}{4}$ inch in diameter. Extending downwardly from the bulb is a lower bulb portion which is a substantially flat tab formed during the bulb manufacturing process. This lower bulb portion extends downwardly approximately $\frac{1}{4}$ inch and has a width of approximately $\frac{1}{4}$ inch, and a thichness of approximately 1/16 inch. Disposed within the bulb are first and second filaments. Attached to the first and second filaments and extending downwardly from the lower bulb portion are first and second copper lead wires having a length of approximately $1\frac{1}{2}$ inches. These lead wires are substantially parallel and lie substantially in the plane of the flat tab extending down from the bulb.

Such negative glow lamps are manufactured in batches, and a typical lamp manufacturing process produces lamps in batches of eight. When the manufacturing process is completed the lamps are typically in an inverted position with the bulbs pointed downward and with the lead wires extending upward therefrom. The lead wires of the eight lamps which are in a horizontal row are clamped between a pair of parallel horizontal clamping bars and typically then are released and dropped into a box or similar container.

SUMMARY OF THE INVENTION

The present invention provides a sequencing drop chute apparatus which takes a batch of eight glow lamps and feeds them one at a time to a single line conveyor which carries the lamps to an automatic aging process.

This sequencing drop chute apparatus includes a support frame with an inclined surface attached to the support frame. A plurality of walls extend upward from an upper portion of the inclined surface and divide said upper portion of the inclined surface into a plurality of chutes. There are eight chutes, one for each of the lamps of a batch of eight lamps.

A camshaft is rotatably mounted upon the frame and includes eight eccentric cams. One of the cams is operably associated with each of the chutes. A plurality of spring strips extend into each of the chutes between said eccentric cams and said inclined surface so that engagement of the eccentric cams with the strips causes each of the strips to cyclicly move between a down position blocking movement of the lamp down its respective chute and an up position allowing a lamp to slide down its respective chute between the spring strip and the inclined surface. The cams are arranged so that the chutes are opened one at a time thereby permitting a batch of eight lamps to pass one at a time through the sequencing drop chute apparatus.

It is therefore a general object of the present invention to provide improved methods and apparatus for handling electrical components.

Another object of the present invention is the provision of improved apparatus and methods for handling negative glow lamps.

And another object of the present invention is the provision of apparatus and methods for receiving a batch of electrical components simultaneously and feeding the electrical components to an outlet one at a time.

Yet another object of the present invention is the provision of apparatus and methods for receiving a batch of negative glow lamps and for feeding the glow lamps one at a time to a single line conveyor.

And another object of the present invention is the provision of a drop chute apparatus including a plurality of parallel chutes with a camshaft means for sequentially opening the chutes to allow electrical components to fall one at a time through the chutes.

Other and further objects, features and advantages of the present invention will be readily apparent to those skilled in the art upon a reading of the following disclosure when taken in conjunction with the accompanying drawings.

BRIEF DESCRIPTION OF THE DRAWINGS

FIG. 1 is a schematic plan view of an automated aging system including the sequencing drop chute apparatus of the present invention.

FIG. 2 is an elevation view of a negative glow lamp.

FIG. 3 is a front elevation view of the sequencing drop chute apparatus.

FIG. 4 is a side elevation view along line 4—4 of FIG. 3.

FIG. 5 is a sectional elevational view along line 5—5 of FIG. 3 showing a profile view of the fifth cam mounted on the camshaft and the associated spring strip of the fifth chute with the spring strip in the open position so that a lamp may pass thereunder.

FIG. 5A is a view similar to FIG. 5 showing the spring strip of the fifth chute in a downward position so that a lamp is prevented from passing thereunder.

DETAILED DESCRIPTION OF THE PREFERRED EMBODIMENTS

Referring now to the drawings, and particularly to FIG. 1, an automated aging system is schematically shown and generally designated by the numeral 10.

In FIG. 2, an elevation view of a negative glow lamp 12 is shown and will now be described for purposes of background reference. The negative glow lamp 12 includes a cylindrical glass bulb 14 being approximately $\frac{1}{2}''$ long and approximately $\frac{1}{4}''$ in diameter. Disposed within the bulb 14 are first and second electrodes 16 and 18 having first and second lead wires 20 and 22, respectively, attached thereto and extending downwardly through the glass bulb 14. The lead wires 20 and 22 are made of copper and are to be attached to other components of an electrical circuit when the lamp 12 is utilized. During the process of manufacturing the lamps 12, the electrodes 16 and 18 are dipped in a liquid. After the lamp has been formed, it is necessary to pass a current through the lead wires 20 and 22, which causes a chemical reaction to occur in the coating on the electrodes 16 and 18 as is well known to those skilled in the art.

The system 10 provides an automated system for handling the lamp 12 during the aging process and for subsequently trimming the length of the lead wires 20 and 22.

The lamps 12 are manufactured on a conventional rotary lamp building table 24. The lamps are manufactured in batches of eight lamps.

Placed adjacent the rotary lamp building table 24 is a sequencing lamp feeder 26. A batch of eight lamps from the lamp manufacturing table 24 are transferred to the lamp feeder 26 by a batch release means 28.

The sequencing lamp feeder 26 transfers the eight lamps sequentially to an endless conveyor belt 30. The purpose of the lamp feeder 26 is to prevent the eight lamps from a given batch from bunching up on the conveyor 30. Lamp feeder 26 causes the lamps to drop one at a time onto the conveyor 30 so that they are traveling down the conveyor head first in a single line as shown by the lamps illustrated upon the conveyor belt 30.

At the end of conveyor belt 30 the lamps 12 are dropped down a sloped chute 32 which feeds the lamp 12 to a lamp alignment roller assembly 34.

The lamp alignment roller assembly 34 aligns the lamps 12 in a vertical manner and rotationally positions them about a vertical axis so that the lead wires 20 and 22 extend downward in a plane approximately the same as that of a vertical plane extending between the two rollers of lamp alignment roller assembly 34.

The lamp alignment roller assembly 34 causes the lamps 12 to move to the right as seen in FIG. 1 so that they are aligned in a row adjacent the rightmost end of tapered rollers 34.

A transfer arm 36 extends upward from a table frame 38 so as to pivot about a vertical axis of a vertical support rod 40.

Transfer arm 36 includes a means at its outer end 42 for picking up one of the lamps 12 from the lamp alignment roller assembly 34. The transfer arm 36 then pivots counterclockwise as seen in FIG. 1 to the position shown in phantom lines. At this point, the outer end 42 of transfer arm 36 is located above a lamp aging conveyor 44. An opening 46 is cut in table frame 38 and the aging conveyor 44 runs therebelow as can be seen in FIG. 1.

A lamp lead wire separator and alignment apparatus 48 then separates the lead wires 20 and 22 of the lamp 12 and straightens the same so that they are oriented approximately as shown in FIG. 2. Then the outer end 42 of transfer arm 36 moves downward inserting the lead wires 20 and 22 into powered receptacles in a carrier block 50 of aging conveyor 44. The lamp 12 is then released by transfer arm 36 and the transfer arm 36 moves back to the position shown in solid lines in FIG. 1.

The aging conveyor 44 is an endless conveyor made up of a plurality of the carrier blocks 50 connected to the links of a pair of parallel roller chains. As the lamp 12 is moved down the conveyor 44, an electric current is periodically passed therethrough for the purpose of aging the lamp to cause the requisite chemical reaction within the bulb 14. Any defective lamps may be visually detected as the lamps are carried down the conveyor 44 and may be removed therefrom by hand.

A second end 52 of conveyor 44 is located adjacent a second table frame 54. A second transfer arm 56 is mounted so as to pivot about a vertical axis of vertical rod 58.

The second transfer arm 56 is initially in a position shown in solid lines in FIG. 1 so that it may pick up a lamp 12 from the conveyor 44. Then the transfer arm 56 rotates counterclockwise to the position shown in phantom lines, which carries the lamp 12 into engagement with a cutter assembly 60 for trimming the lead wires of the lamp.

When the lamps are initially picked up from the second end of conveyor belt 44, their position within a holding device attached to the outer end of transfer arm 56 is determined by a lifting arm 62 pivoted about its rear end 64, which pushes the lamps 12 up into the holding device of transfer arm 56 to a predetermined elevation so as to determine the elevation at which the lead wires of the lamp 12 engage the cutters of cutter assembly 60.

After the lead wires are trimmed at cutter assembly 60, the lamps are dropped down in inclined chute 66 which directs them into a container 68.

THE SEQUENCING LAMP FEEDER

Referring now to FIGS. 3 and 4, the sequencing lamp feeder 26 of the present invention is shown in detail. Also shown are the batch release means 28 and the front end of conveyor 30.

The batch release means 28 is a part of a typical prior art lamp manufacturing apparatus which, as a final step, grasps a batch of eight lamps 12 by their lead wires 20 and 22 and carries them to a point at which they are to be released. The batch release means 28 includes a pair of vertical arms 112 and 114 (best seen in FIG. 4) which have parallel horizontal clamping plates 116 and 118 attached to their lower ends. The arms 112 and 114 can move apart to release the lamps 12 or to allow the lamps 12 to be received therebetween. The arms 112 and 114 may then be moved together to clamp the lead wires 20 and 22 of lamps 12 between clamping plate 116 and 118.

As mentioned, in a typical prior art lamp manufacturing apparatus the batch release means 28 clamps the leads 20 and 22 of a batch of eight lamps 12 and removes them from the lamp manufacturing apparatus. The batch of lamps 12 is then carried to a position typically over a box or other container and the arms 112 and 114 are spread apart thereby releasing the lamps 12.

In the present invention, the batch release means 28 stops at a position located above an upper end 120 of lamp feeder means 26. The lamps 12 are then released and dropped into the lamp feeder 26 as is further described below.

A feeder outlet 122 is located at a lower end of lamp feeder means 26, and the conveyor means 30 is located below outlet 122 for receiving the lamps 12 therefrom.

The conveyor 30 includes an endless leather belt 124 which travels in a direction away from the lamp feeder means 26 to carry the lamps 12 to chute 32 and rollers 34.

The lamp feeder means 26 provides a means for receiving batches of eight lamps 12 from the batch release means 28 and for feeding the eight lamps of each batch one at a time to the feeder outlet 122 so that they may be received one at a time upon the moving belt 124 of conveyor 30 which conveys the lamps 12 in a single line up the conveyor 30, as seen in FIG. 1.

Lamp feeder means 26 will now be described with reference to FIGS. 3–5. Feeder means 26 includes a support frame 126 which is attached to a table frame 128.

A bottom plate 130 which has an inclined planar top surface 132 is attached to the upper end of support frame 126 as is best shown in FIG. 4.

The inclined surface 132 includes an upper rectangular portion 134 and a lower trapezoidal portion 136.

Nine walls 138 through 154 extend upward from upper portion 134 of inclined surface 132 and divide said upper portion 134 of inclined surface 132 into eight parallel chutes 156-170.

As is best seen in FIG. 3, the batch release means 28 releases the eight lamps 12 simultaneously dropping one into each of the chutes 156-170.

Connected to the first and ninth walls 138 and 154 are a pair of lower converging side walls 172 and 174 which converge downwardly to the feeder outlet 122.

As is best seen in FIG. 4, there are near the upper end 120 of component feeder means 26 first and second posts 176 and 178 which extend upwardly from first and ninth walls 138 and 154.

A strip mounting bar 180 is connected between posts 176 and 178 by screws 182 and 184.

Eight spring strips 186-200 have their upper ends attached to spring mounting bar 180 by screws such as 202 best seen in FIG. 5.

Attached to the bottom side of botton plate 130 is a horizontal support bar 204 which has support plates 206 and 208 attached to its ends by machine screws 210 and 212.

Rotatably mounted between support plates 206 and 208 in bearing blocks 214 and 216 is a camshaft 218.

Attached to camshaft 218 are eight eccentric cams 220-234.

Camshaft 218 is driven by an electric motor 236 through a gear reducer 238 mounted upon support plate 208.

As best seen in FIG. 4, an adjustment bolt 240 is threaded into a tapped and threaded hole within a plate 242 attached to bottom plate 130 at weld 244. A retaining spring 246 biases support plate 206 against an outer end 248 of adjustment bolt 240 so that a height of camshaft 218 above bottom plate 130 may be adjusted by rotation of adjustment bolt 240, thus adjusting a downward deflection of spring strips 186-200.

The relationship of the eight chutes 156 through 170, the eight spring strips 186 through 200, and the eight eccentric cams 220 through 234, is best shown in FIGS. 5 and 5A which illustrate the opened and closed positions respectively of fifth chute 164. The fifth eccentric cam 228 is shown in profile in FIGS. 5 and 5A. Fifth eccentric cam 228 includes a peripheral outer surface including a partially circular portion 250 and a flat portion 252 which defines a chord of the partially circular portion 250. The partially circular portion 250 has a center of curvature coincident with the axis of rotation of camshaft 218.

In FIG. 5 the fifth cam 228 is shown in its open position with its flat chord portion 252 in engagement with an intermediate part of fifth spring strip 194 thereby allowing the spring strip 194 to move upward out of engagement with the inclined surface 134 due to the resilience of the spring strip 194. Thus a lamp 12 may pass under the spring strip 194 between its lower end 254 and the inclined surface 132.

When eccentric cam 228 is rotated to such position that its partially circular surface 250 is in engagement with the spring strip 194 the spring strip 194 is oriented as shown in FIG. 5A with its lower end 254 engaging the inclined surface 132 so as to close the chute 164 and prevent a lamp 12 from sliding down the chute 164.

The eight eccentric cams 220 through 234 are preferably offset 45° from each other and are arranged so that only one of the eight chutes 156 through 170 is opened at any given time. Thus, with a single rotation of camshaft 218 each of the chutes 156 through 170 is opened for approximately ⅛ of the period of time required for the one revolution of camshaft 218.

The camshaft 218 therefore provides a means for periodically blocking and periodically opening each of the chutes 156 through 170. This is done by engagement of the eight cams 220 through 224 with intermediate portions of the eight spring strips 186 through 200 so as to cause the strips 186 through 200 to cyclically move between a down position such as shown in FIG. 5A for fifth strip 194 and blocking its respective chute such as chute 164, and an up position as shown in FIG. 5 allowing a lamp 12 to slide down the fifth chute 164. Each of the lamps 12 that is allowed to drop through one of the chutes 156 through 170 is directed by converging side walls 172 and 174 to the feeder outlet 122 from which it drops to the conveyor means 30.

A typical lamp manufacturing machine 24 produces a batch of eight lamps approximately every six or seven seconds. In a preferred embodiment the drive means of the present invention, including motor 236 and gear reducer 238, are so constructed tha the camshaft 218 rotates at a speed of approximately 10 rpm so that it goes through approximately 1½ revolutions for every batch of lamps released by the batch release means 28. In this manner, approximately twelve openings of a chute are provided for every eight lamps dropped in the eight chutes. This insures that each chute is opened at least once for each batch of lamps dropped into the feeder means 26 and allows for some variation in the period between the release of batches of lamps thereby preventing the lamps from collecting in the feeder means 26.

Thus it is seen that the apparatus and methods for handling lamps of the present invention are readily adapted to achieve the ends and advantages mentioned as well as those inherent therein. While certain preferred embodiments of the invention have been illustrated for the purpose of this disclosure, numerous changes in the arrangement and construction of parts may be made by those skilled in the art, which changes are encompassed within the scope and spirit of this invention as defined by the appended claims.

What is claimed is:

1. A sequencing drop chute apparatus for feeding a batch of electrical components one at a time to a single line conveyor, comprising:
   a support frame;
   an inclined surface attached to said support frame;
   a plurality of walls extending upward from an upper portion of said inclined surface and dividing said upper portion of said inclined surface into a plurality of chutes, there being at least one chute for each electrical component of said batch of electrical components;
   a camshaft, rotatably mounted upon said frame above said inclined surface, and including a plurality of eccentric cams extending downward toward said chutes, one of said cams being operably associated with each of said chutes for periodically blocking and periodically opening each of said chutes, said cams being arranged so that said plurality of chutes are opened one at a time thereby permitting said batch of electrical components to pass one at a time through said drop chute apparatus; and
   a plurality of spring strips, one extending into each of said chutes between said eccentric cams and said inclined surface so that engagement of said eccentric cams with said strips causes each of said strips to cyclically move between a down position blocking movement of an electrical component down its respective chute and an up position allowing an electrical component to slide down its respective chute between said strip and said inclined surface.

2. The apparatus of claim 1, wherein:

said apparatus includes a strip mounting bar, supported from one of said frame and said inclined surface, and located above said chutes and oriented transversely to said chutes; and each of said spring strips has an upper end attached to said strip mounting bar, has an intermediate portion extending below and in engagement with one of said eccentric cams, and has a lower end received in one of said chutes.

3. The apparatus of claim 2, further comprising:

means for adjusting a height of said camshaft above said inclined surface to adjust a downward deflection of said spring strips by said eccentric cams.

4. The apparatus of claim 1, wherein:

each of said eccentric cams has a radially outer profile defined by a partially circular portion and a flat portion defining a chord of said partially circular portion, said partially circular portion having a center of curvature substantially coincident with an axis of rotation of said camshaft.

5. The apparatus of claim 1, further comprising:

a pair of downwardly converging side walls extending upward from a lower portion of said inclined surface below said chutes, spaced lower ends of said side walls defining a drop chute outlet.

6. A system for handling electrical components, comprising:

batch release means for periodically releasing batches of electrical components, each of said batches including a plurality of electrical components which are released simultaneously by said batch release means;

component feeder means for receiving said batches of electrical components from said batch release means and for feeding said plurality of electrical components of each batch one at a time to a feeder outlet prior to the releasing of a subsequent batch of electrical components by said batch release means;

conveyor means for receiving said electrical components one at a time from said feeder outlet and conveying said components in a single line;

wherein said component feeder means comprises:

an inclined surface divided by side walls into a plurality of parallel chutes, there being at least one chute for each electrical component of one of said batches of electrical components, said surface being sufficiently inclined that electrical components received in upper ends of said chutes from said batch release means will slide down said chutes due to gravity;

sequencing means, operably associated with said plurality of chutes, for causing said electrical components to exit said chutes sequentially, said sequencing means including a rotatable camshaft including a plurality of cams, one of said cams extending toward each of said chutes and controlling movement of components down each of said chutes; and a plurality of spring strips, one extending into each of said chutes between said cams and said inclined surface so that engagement of said cams with said strips causes each of said strips to cyclically move between a down position blocking movement of an electrical component down its respective chute and an up position allowing said electrical component to slide down its respective chute between said strip and said inclined surface.

7. A system for handling electrical components, comprising:

batch release means for periodically releasing batches of electrical components, each of said batches including a plurality of electrical components which are released simultaneously by said batch release means;

component feeder means for receiving said batches of electrical components from said batch release means and for feeding said plurality of electrical components of each batch one at a time to a feeder outlet prior to the releasing of a subsequent batch of electrical components by said batch release means;

conveyor means for receiving said electrical components one at a time from said feeder outlet and conveying said components in a single line;

wherein said component feeder means comprises:

a support frame;

an inclined surface attached to said support frame;

a plurality of walls extending upward from an upper portion of said inclined surface and dividing said upper portion of said inclined surface into a plurality of chutes, there being at least one chute for each electrical component of one of said batches of electrical components;

a camshaft, rotatingly mounted upon said frame, and including a plurality of eccentric cams, one of which is operably associated with each of said chutes for periodically blocking and periodically opening each of said chutes, said cams being arranged so that said plurality of chutes are opened one at a time thereby permitting said electrical components of each of said batches to pass one at a time through said component feeder means, said camshaft being located above said inclined surface and said eccentric cams extending downward toward said chutes; and a plurality of spring strips, one extending into each of said chutes between said eccentric cams and said inclined surface so that engagement of said eccentric cams with said strips causes each of said strips to cyclically move between a down position blocking movement of an electrical component down its respective chute and an up position allowing an electrical component to slide down its respective chute between said strip and said inclined surface.

8. The system of claim 7, wherein:

said component feeder means further includes a strip mounting bar, supported from one of said frame and said inclined surface, and located above said chutes and oriented transversely to said chutes; and each of said spring strips has an upper end attached to said strip mounting bar, has an intermediate portion extending below and in engagement with one of said eccentric cams, and has a lower end received in one of said chutes.

9. The system of claim 1, wherein said component feeder means further comprises:

means for adjusting a height of said camshaft above said inclined surface to adjust a downward deflection of said spring strips by said eccentric cams.

10. The system of claim 7, wherein:
each of said eccentric cams has a radially outer profile defined by a partially circular portion and a flat portion defining a chord of said partially circular portion, said partially circular portion having a center of curvature substantially coincident with an axis of rotation of said camshaft.

11. The system of claim 7, wherein said component feeder means further comprises:
a pair of downwardly converging side walls extending upward from a lower portion of said inclined surface below said chutes, spaced lower ends of said side walls defining said feeder outlet.

12. A method of handling electrical components, comprising:
periodically dropping batches of electrical components into a plurality of parallel inclined chutes, each of said batches including a plurality of electrical components which are dropped simultaneously, one into each of said chutes;
opening each of said chutes one at a time prior to dropping a subsequent batch of electrical components into said chutes; thereby
releasing said components one at a time to slide out their respective chutes;
directing said components from said chutes to a single component outlet; and
wherein said opening step is further characterized as rotating a camshaft having a plurality of eccentric cams thereon engaged with a plurality of spring strips, one of which extends into each of said chutes, so that said spring strips one at a time raise up above a bottom surface of said chutes to allow an electrical component to slide down said chutes below said raised strips.

13. The method of claim 12, further comprising:
receiving said components on a conveyor one at a time from said outlet; and
conveying said components in a single line on said conveyor.

14. A lamp feeder apparatus, comprising:
an inclined surface divided by side walls into a plurality of parallel chutes, said surface being sufficiently inclined that lamps placed in said chutes at upper ends thereof will slide down said chutes due to gravity;
sequencing means, operably associated with said plurality of chutes, for causing said chutes to be opened one at a time, said sequencing means including a rotatable camshaft located above said chutes and having a plurality of cams, one of said cams extending toward each of said chutes for controlling movement of lamps down each of said chutes; and
a plurality of spring strips extending one into each of said chutes between said cams and said inclined surface so that engagement of said cams with said strips causes each of said strips to cyclically move between a down position blocking movement of a lamp down its respective chute and an up position allowing said lamp to slide down its respective chute between said strip and said inclined surface.

15. The apparatus of claim 14, further comprising:
converging side wall means attached to a lower portion of said inclined surface below said chutes, for directing lamps from each of said chutes to a single lamp feeder outlet.

* * * * *

UNITED STATES PATENT AND TRADEMARK OFFICE
CERTIFICATE OF CORRECTION

PATENT NO. : 4,424,894
DATED : January 10, 1984
INVENTOR(S) : John Fajt and James V. Neal, Jr.

It is certified that error appears in the above-identified patent and that said Letters Patent are hereby corrected as shown below:

Column 1, line 19, delete "thichness" and insert --thickness--

Column 6, line 22, delete "tha" and insert --that--.

In The Claims:

Column 8, line 67 (Claim 9), delete "1" and insert --8--.

Signed and Sealed this

Twenty-seventh Day of March 1984

[SEAL]

Attest:

GERALD J. MOSSINGHOFF

Attesting Officer  Commissioner of Patents and Trademarks